(12) United States Patent
Baumgartner et al.

(10) Patent No.: US 6,330,841 B1
(45) Date of Patent: Dec. 18, 2001

(54) APPARATUS FOR DRIVING SCREWS MOUNTABLE ON A DRIVE UNIT

(75) Inventors: Albert Baumgartner, Kriessern; Richard Sahli, Widnau; Daniel Gasser, Diepoldsau; Paul Muller, Widnau; Walter Untersander, Berneck, all of (CH)

(73) Assignee: SFS Industrie Holding AG, Heerbrugg (CH)

( * ) Notice: Subject to any disclaimer, the term of this patent is extended or adjusted under 35 U.S.C. 154(b) by 0 days.

(21) Appl. No.: 09/525,091

(22) Filed: Mar. 14, 2000

Related U.S. Application Data

(63) Continuation of application No. 08/605,633, filed on Feb. 22, 1996, now abandoned.

(30) Foreign Application Priority Data

Feb. 23, 1995 (DE) ............................................. 195 06 336

(51) Int. Cl.$^7$ ..................................................... B25B 23/10
(52) U.S. Cl. ............................................. 81/57.37; 81/451
(58) Field of Search ................................... 81/57.37, 429, 81/431, 433, 451–453

(56) References Cited

U.S. PATENT DOCUMENTS 4,539,872 * 9/1985 Bochman, Jr. ....................... 81/57.37
5,207,127 * 5/1993 Nick ................................. 81/57.37 X

* cited by examiner

*Primary Examiner*—D. S. Meislin
(74) *Attorney, Agent, or Firm*—Volpe and Koenig P.C.

(57) ABSTRACT

A screw holder mountable on a drive unit having a tubular passage with two axially-aligned sections, each provided with locking and centering elements, such that a screw inserted into such holder can initially only penetrate until the screw head is reliably held and suspended in the first section by the locking elements. The force of the centering and locking elements upon the screw head is overcome when the apparatus is placed on the screw location and an engagement tool coupled to a drive shaft is brought into driving engagement with the screw head, which driving movement forces the locking elements radially outward in response to the axial load upon the screw head and the passage of the screw head therethrough. After the screw head passes through the first section within the tubular passage, the screw shaft is engaged by the centering elements of the second section. The centering elements of the second section are then also forced back as the head of the screw passes therethrough.

21 Claims, 5 Drawing Sheets

APPARATUS FOR DRIVING SCREWS MOUNTABLE ON A DRIVE UNIT

CROSS REFERENCES TO RELATED APPLICATIONS

This application is a continuation of prior application Ser. No. 08/605,633 filed Feb. 22, 1996, now abandoned.

FIELD OF THE INVENTION

The invention relates to an apparatus for driving-in screws that is mountable on a drive unit. The apparatus consists of a drive shaft with an engagement tool disposed or constructed at the end thereof, and further consists of a pivotably mounted screw holder with a tubular passage for accommodating and housing an inserted screw prior to the driving of such screw into a workpiece. Movable locking and centering elements in the tubular passage are axially separated and intended to engage opposite end of a screw that is to be inserted therein.

BACKGROUND OF THE INVENTION

Fastener supports for facilitating the installation of screws and other fasteners are known in various embodiments. One example is shown in U.S. Pat. No. 5,341,708, where the head of a screw is inserted into an apparatus from the free, open end thereof, and is captured by ball-like centering and locking elements in a passageway that are pressed outwards in response to the passage of the screw head. A displaceable sleeve on the apparatus must first be slid or pushed back and held so that the centering and locking elements can move into a position in which they do not engage or block the passageway. Once the sleeve is released, however, the centering and locking elements are forced radially inward and thereby rigidly held. This results in the screw being captively held against the screwing device while the threaded portion of the screw, including the tip, protrudes beyond the apparatus. Such an arrangement might be sufficient for hand-held screwing devices having a slidable chuck-like sleeve. In the case of heavier screwing devices, however, which screwing is to be carried out, for example, in the ground region, it is preferable if the screw does not have to be introduced from below. It is also preferable if the thread or tip of the screw only protrudes from the passageway during the screwing-in process, and not before.

It is also known to feed or deliver screws through a tube or a conduit, which is offset laterally in relation to the screw axis, wherein, at the free or open end of the device placeable on the workpiece in the region of the tubular passage, centering or holding elements for the inserted screws are provided. With such an arrangement, however, once the feeding tube has been swiveled or pivoted into alignment with the screwing-in axis, the tips of the screws and the threaded front regions protrude beyond the apparatus and can thus damage the surface of the workpiece. Such a known construction, as described in DE-A-38 08 889, is more suitable for shorter screws. In the case of longer screws, however, and as a result of the swiveled-out position of the screw holder, problems would be encountered by the interference of the exposed screw with various parts of the device. A further known embodiment, as described in DE-A-31 12 520, provides for the capture of screws supplied by a pivotable screw holder and a passage that is closed off at the bottom in the swiveled-out position. However, as soon as the screw holder has been swiveled into a position in alignment with the screwing-in axis, the screw falls down into the adjoining passage below and the screw shaft is no longer being guided. Such an arrangement is again only practical with very short screws.

Another prior art apparatus for screwing-in screws is shown in EP-A-547638, which consists of a drive shaft having an engaging tool disposed at the freely protruding end thereof and a screw holder with a tubular passage. Axially-separated holding and centering elements for an inserted screw capable of moving outwards engage in two sections of the passage. This apparatus eliminates the above-described disadvantage of the protruding screw. However, for the following reasons, it is also suitable only for relatively short screws. This known apparatus provides two embodiments. In one embodiment, a screw is held simultaneously through both sections by outwardly pivotable locking and centering elements. There must be a relatively narrow axial gap between the holding and centering elements, because a lower element controls an upper element via a projection in such a way that the upper element is always slightly open. Thus, a screw, falling from the top to the bottom, falls past the upper element or clamping jaw without being held thereby, until its tip is held by the clamping site of the lower element or jaw, resulting in the screw being aligned in the apparatus only at its tip. Leaf springs are used to exert pressure on the elements or jaws in their closed position. Obviously, as a result of the short segment on which the shaft of the screw is clamped, only relatively short screws can be centered reliably. In another embodiment, the lower region has a widened inner opening in which two locking jaws are pivotably mounted, which are forced into the closed position by springs. The inner walls of the locking jaws are funnel-shaped, the funnel becoming narrower in the downward direction with an axially aligned opening present in the region of the underside. A descending screw reaches this opening and is therefore automatically centered. A screw falling downwards from the top is thus held between the two locking jaws with its tip through the opening. The upper end of the screw is held by the inner walls of the tube surrounding the head. Any further possible deviation of the longitudinal axis of the screw from the longitudinal axis of the screwing apparatus is governed by the differences in the diameter of the inner opening of the tube and the diameter of the screw head. In order to ensure adequate gripping, even for small screw heads, provisions are made for the insertion of a further tubular element. Obviously, this embodiment of the known screwing apparatus is also suitable only for relatively short screws, since the internal diameter of the tube must essentially be as large as the diameter of the screw head or be reduced in size to the diameter of the screw head by the insertion of an additional tubular element or sleeve. Thus, in this embodiment, screws supplied obliquely from a magazine can reach the tube only if they are very short, because the tube, as described above, can have an internal diameter only of the order of magnitude of the diameter of the screw head, so that the screw can be guided adequately at its upper end. With this embodiment of the known screwing apparatus also, long screws can consequently not be handled and delivered.

This disadvantage is also exhibited in GB 2 206 828 A, wherein axially and angularly spaced locking and centering elements consist of flexible lamellae and protrude inwards towards the tool or screw axis. Four sets of lamellae grip the screw shaft only in the vicinity of the screw tip, while the remaining portion of the screw shaft is gripped only by three sets of lamellae, and the screw must be introduced obliquely laterally through an opening. Obviously, the lateral insertion opening provided and the fact that the inserted screw is only held in the region of its tip only permit relatively short screws to be reliably centered, not to mention the susceptibility of the flexible lamellae to defects and wear, which can greatly impair the centering of even short screws after a brief period of use.

SUMMARY OF THE INVENTION

It is an object of the present invention, therefore, to provide an apparatus capable of processing relatively long screws so that the shaft of the screw is securely and reliably centered until the screw is used at the job site and during the driving-in of such screw into a workpiece.

The apparatus of the present invention consists of a screw holder having a tubular passage therethrough with two, axially-aligned sections, each provided with locking and centering elements, such that a screw inserted into such apparatus can initially only pass until the screw head is reliably held and suspended in the first section by the locking elements. The force of the locking elements upon the screw head is overcome when the apparatus of the invention is placed on the screw location and an engagement tool coupled to the drive shaft is brought into driving engagement with the screw head, which driving movement forces the locking elements radially outward in response to the axial load upon the screw head and the passage of the screw head therethrough. After the screw head passes through the first section within the tubular passage, the screw shaft is engaged by the centering elements of the second section. The centering elements of the second section are then also forced back as the head of the screw passes therethrough and exits the apparatus of the invention through its lower, open end.

Thus, these two described sections with locking and centering elements, which are axially separated by an appropriate distance, have basically different functions. The function of the first section is generally restricted to initially holding an inserted screw, while that of the second section is generally restricted to centering the shaft of the screw during the driving-in process. In a preferred embodiment, the distance from the first section to the open end of the apparatus placed upon a workpiece is greater than the maximum length of an insertable screw, thereby ensuring that the tip and thread of the screw or corresponding fastener provided at the free end thereof does not protrude beyond such free end of the apparatus until the time when it is desired to drive in such screw. Thus, the axial distance between the first and second sections is preferably equal to or greater than the maximum length of an inserted screw, since the tip or screw shaft does not have to be centered initially when the screw is inserted in the screw holder. In accordance with the invention, the screw tip or shaft is centered only when the screw, when being engaged by the engagement tool disposed at the end of the drive shaft, is driven or advanced axially in the tubular passage. It is also preferable therefore, that the second section with the centering elements be located near the end of the apparatus, so that appropriate centering can be undertaken nearest to the workpiece into which the screw is to be driven.

DETAILED DESCRIPTION OF THE PREFERRED INVENTION

The screw holder of the invention is simple in design. It is constructed as a tubular body having a tubular passage therethrough, and further having a first and second section with locking and centering elements at each end of the screw holder. It is a particularly advantageous feature that such screw holder can be removed from a drive unit and exchanged without difficulty, particularly during servicing, i.e., when a new part is to be inserted and/or when screws having a different shaft diameter or head diameter are to be processed.

Another advantageous feature is the preferred use of balls as locking and centering elements in such first and second sections, which are held in radial guides along the screw holder and optionally are spring-loaded in the direction of the screw axis. Such spring-loaded locking and centering elements are preferably achieved through the use of a continuous peripheral groove around such elements into which is inserted a spring. This spring may consist of a spring wire bent in the shape of a ring, or of a helical spring section assembled into a peripherally closed spring, which spring surrounds and urges the locking and centering elements inward toward the screw axis.

In one embodiment of the present invention, the strength of the spring present in the first section of the screw holder might be different than the strength of the spring present in the second section of the screw holder. It is thus possible, for example, to provide a spring of lesser strength for the captive holding of the screw head in the first section than for the centering of the screw shaft in the second section. Similarly, the diameters of the balls or locking and centering elements of the two sections may also be different. It is therefore possible to adapt the apparatus of the invention to different circumstances, since the ease or difficulty of pressing the centering or locking elements back in the radial direction depends on the diameter of the balls and the strength of the springs.

For optimal alignment of an inserted screw during the driving process, it is preferable to adapt the internal diameter of the tubular passage of the screw holder to the external diameter of the screw head. Even though appropriate guidance is already provided for the screw shaft, the additional guidance in the region of the screw head with an appropriate distance therefrom brings about an even more accurate alignment.

It is also particularly advantageous if the screw holder of the present invention is mounted on a part of the housing of the apparatus of the invention so that it is pivotable about a horizontal axis from a position aligned with the screw axis to a position aligned with a screw feeding tube. When fed through a feeding tube, the screw reaches the screw holder and is captively supported at the screw head by centering and locking elements in the first section of the holder. This capturing of the screw and resultant containment of the screw head, shaft and tip completely within the screw holder enables swiveling of the screw holder into alignment with the engagement tool and drive shaft to proceed without problems. This is a significant advancement over the known construction described in DE-A-31 12 520, for which the lower end of the screw holder is sealed in the swiveled out position, since the holder of the present invention precisely maintains the entire screw within in the screw holder and therefore such screw cannot strike or scratch any position outside of the screw holder.

In order to have as much room as possible available for the pivoting or swiveling process, without also taking up the space opposite the feed tube, it is preferred that the pivoting axis of the screw holder be disposed in the region of the second section of the screw holder or between such second section and the free end of the screw holder. The feed tube should also not be too far away from the driving apparatus, and it should be possible in a simple manner to align the feed tube and the screw holder coaxially with respect to each other. Furthermore, it is preferable if there is a straight-line transition between the feed tube and the screw holder so that relatively long screws can be fed through the tube and captured within the screw holder without being interrupted by a snag or kink.

In accordance with the preferred embodiment of the invention, the screw holder is provided with a spherical head surface in the region of the pivoting axis, i.e., upon which the screw holder pivots between the feed tube and the drive shaft, which engages with a spherical socket-shaped recess in the housing part of the apparatus. In practice, no hinge pin is needed, since an adequate and precise bearing about the center of the spherical region is possible purely through the support of the corresponding area of the screw holder.

In order not to have to execute the corresponding pivoting movements by hand, the swiveling or pivoting movements can take place automatically. In this regard, the screw holder is preferably swiveled about the horizontal axis via a two-armed lever, i.e., a lever member having a first arm and a second arm, which is attached by a bolt through a radially projecting shoulder in the screw holder and functions in response to the start of the depressing motion and the end of the return motion of the drive shaft. An orderly swiveling or pivoting motion is provided so that the screw holder is aligned with the drive shaft after only a slight depression of the drive shaft. As soon as the drive shaft is returned to its resting position in the last section of the drive shaft movement, the screw holder is swiveled or pivoted back into alignment with the feed tube in preparation to receive another screw.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 1:
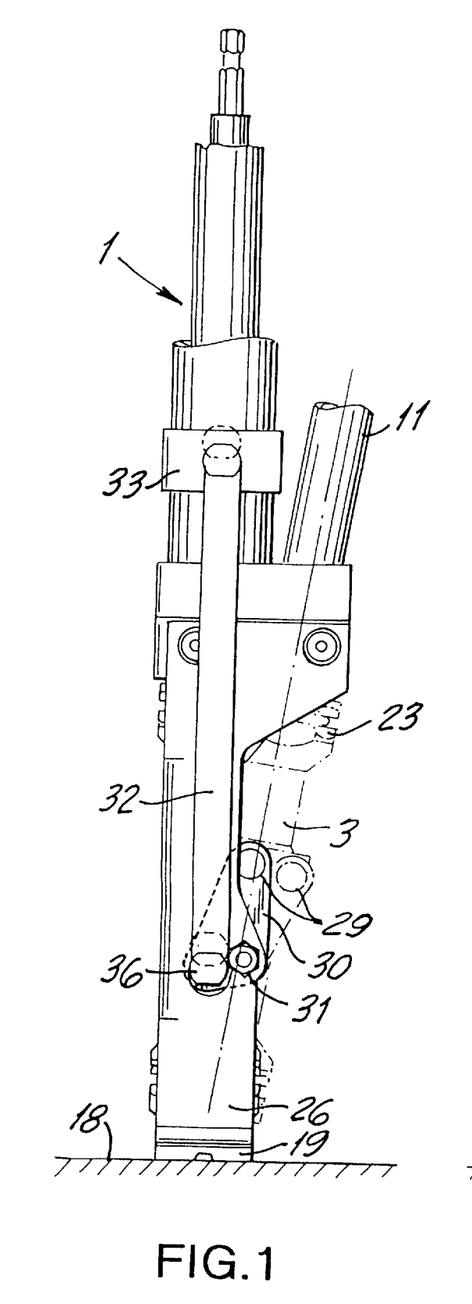
FIG. 1 is a side view of the apparatus of the invention.
Figure 2:
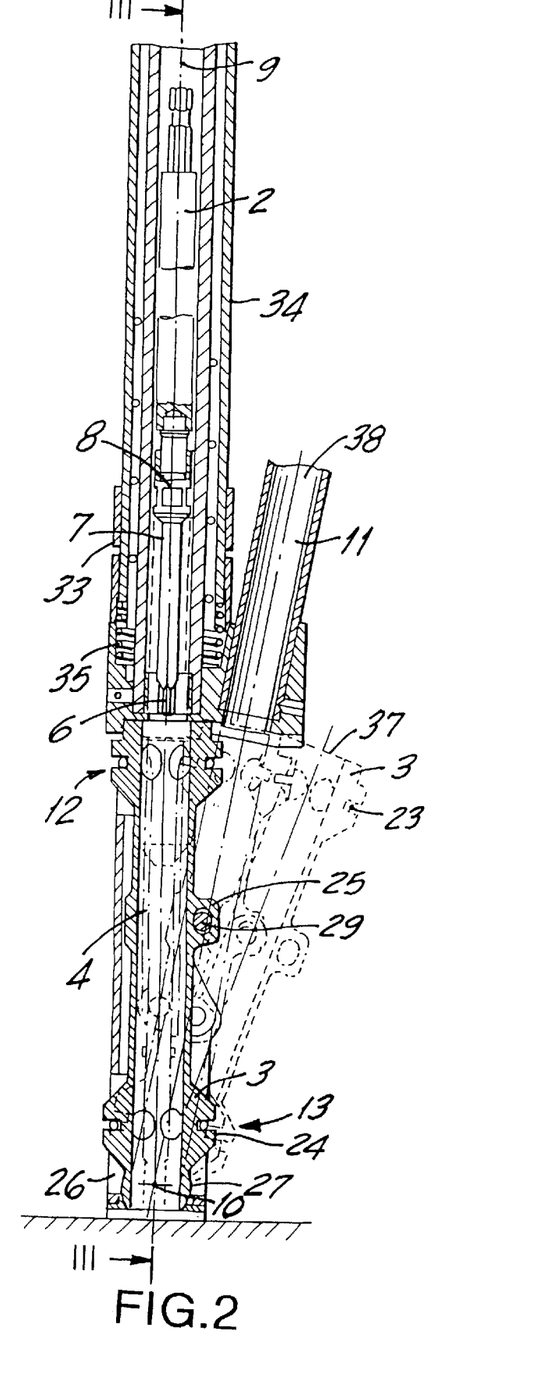
FIG. 2 is a vertical section through the apparatus of the invention, showing three different positions of the screw holder.

FIG. 1 is a side view and FIG. 2 is a vertical section taken of the apparatus of the invention 1, which can be mounted on a drive unit and consists essentially of a drive shaft 2 displaceable in the driving direction along the screw axis 9, and a screw holder 3 having a tubular passage 4 for a screw 5 (FIG. 3) to be inserted therein. An engagement tool 6 (FIG. 2), which engages a screw head 16 (FIG. 3), is provided at the freely projecting end of the drive shaft 2, which engagement tool 6 is part of tool 7 (FIG. 2) that is coupled to the drive shaft 2 via a suitable connection means 8 (FIG. 2).

Figure 3:
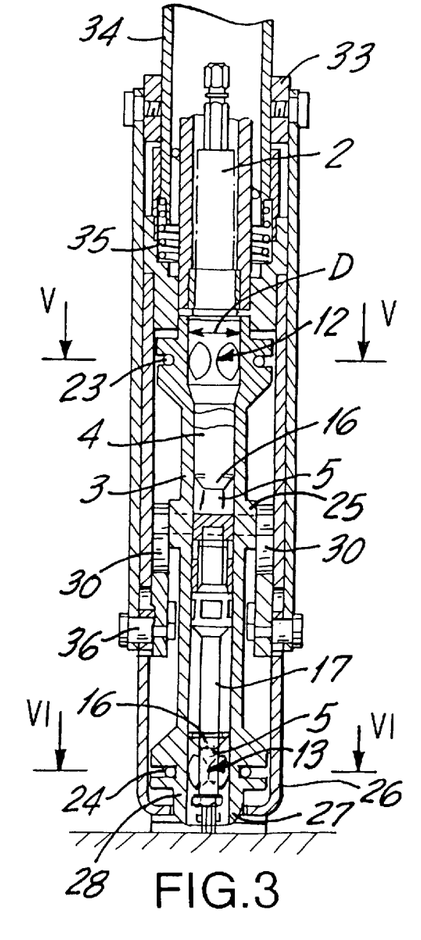
FIG. 3 is a section taken along line III—III in FIG. 2.

Screws 5 shown in FIG. 3 are inserted into the tubular passage 4 in the screw holder 3 from above via a feed tube 11 shown in FIGS. 1–2. The screw holder 3 is pivotable about a horizontal axis 10 from a position aligned with the feed tube 11 to a position aligned with the driving-in or screw axis 9. The pivoting screw holder 3 saves a considerable amount of space as compared with a fixed screw holder that must be loaded from above. For example, if the screw holder were fixed along the screw axis, necessitating loading from above, it would be necessary to have an appropriate amount of free space above the screw holder for the introduction of a screw. In such example, however, not only the overall height of the apparatus of the invention, but also the distance traveled by the drive unit together with the drive shaft 2, would be significantly greater.

Figure 7:
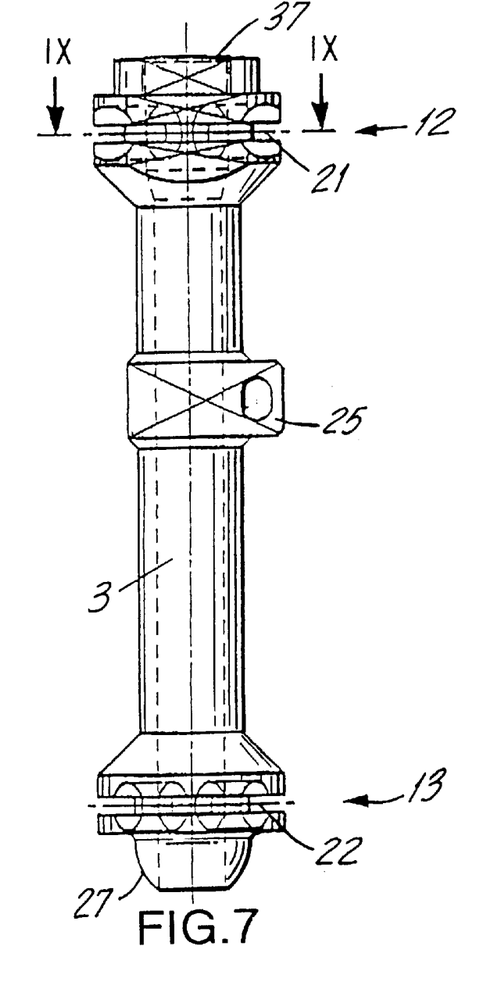
FIG. 7 is a side view of the screw holder of the present invention.
Figure 8:
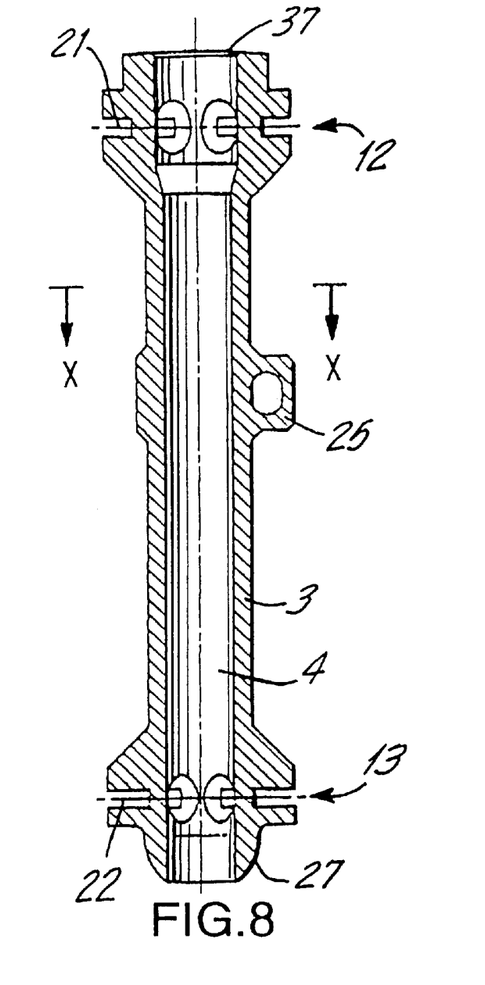
FIG. 8 is a vertical section taken through the screw holder of the invention.
Figure 14:
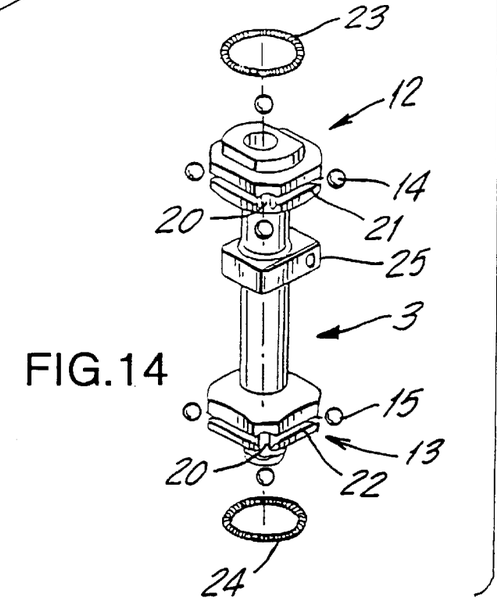
FIG. 14 is an exploded view of the screw holder of FIG. 13.

As shown in FIGS. 7–8 and 14, the screw holder 3 has a first section 12 and a second section 13 separated by an axial gap A (FIG. 4), with locking and centering elements 14 and 15 (FIG. 14) provided in the tubular passage 4. In the preferred embodiment, these locking and/or centering elements are shown and described as balls 14 and 15. However, one skilled in the art will recognize that other holding and centering elements may be used to accomplish the same purpose. For example, instead of balls that hold and center the screws in the tubular passage, which balls are spring loaded (described in more detail later) and movable in response to the passage of the screw, and more particularly the screw head thereby, it is also possible to use appropriate bolts or pins (not shown), the ends of which would protrude into the tubular passage 4 and would be constructed in the form of a hemisphere.

The first section 12 of the screw holder 3 forms a locking station for supporting a screw head 16, while the second section 13 forms a centering station for the centered guidance of the screw shaft or shank 17. The distance B (FIG. 4) from the first section 12 to the free or open end 19 (FIG. 1) of the apparatus 1, which open end 19 can be set or placed on a workpiece 18, is preferably equal to or greater than the maximum length of an insertable screw 5. As a result, such screw 5 does not protrude beyond the open end 19 of the apparatus 1, thereby preventing damage to the surface of the workpiece 18 during movement of the apparatus 1. The tip of the screw comes into contact with the workpiece 18 only when the drive unit, together with the drive shaft 2, is pressed downward at the desired location.

The second section 13 of the screw holder 3 is provided near the open end 19 of the apparatus 1 in order to effect the necessary centering of the screw shaft 17 during the driving or screwing-in process. It is most preferable to have the axial distance A between the first and second sections 12, 13 be equal in size or greater than the maximum length of an insertable screw 5. Since the second section 13 is only required for centering the screw during the driving process, it is preferable if the centering and locking elements 14 of the first section 12 only have to be forced apart slightly in response to the initial passage of the screw shank 17, so that the screw can be easily inserted or introduced into the tubular passage 4 and held by its screw head 16 at the first section 12.

Figure 9:
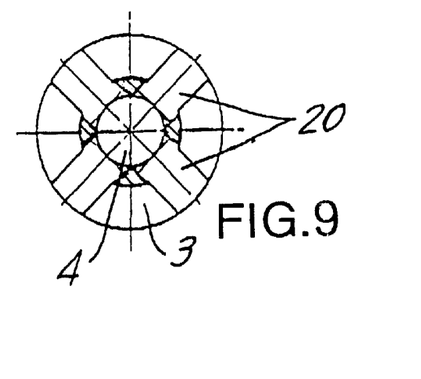
FIG. 9 is a section taken along line IX—IX of FIG. 7.
Figure 10:
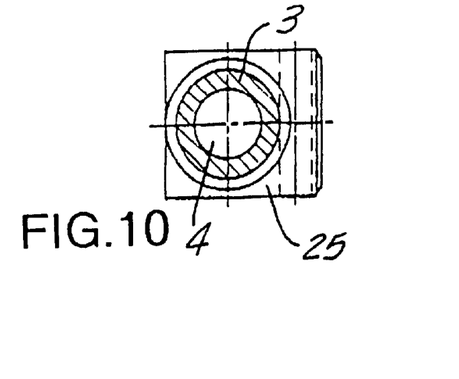
FIG. 10 is a section taken along line X—X of FIG. 8.
Figure 11:
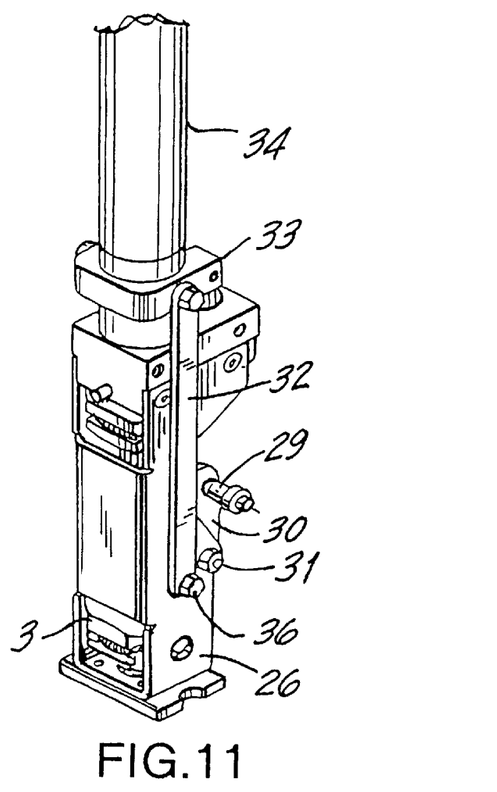
FIG. 11 is a perspective view of the apparatus of the invention.
Figure 12:
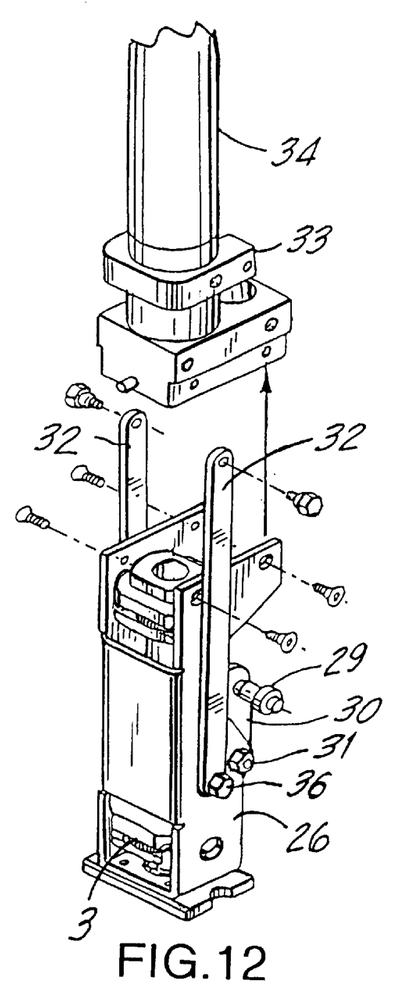
FIG. 12 is an exploded view of FIG. 11.

As shown in FIGS. 9 and 14, balls 14, 15 are displaceably held in radial guides 20, which guides 20 become narrower to such an extent that the balls 14,15 are prevented from falling into the tubular passage 4 of the screw holder 3. The balls 14 and 15 are preferably spring loaded in the direction of the tubular passage 4, so that when an inserted screw 5 is driven downwardly, the balls 14,15 have to be forced radially outward by the screw head 16 in order to have an opening for the passage of the screw head 16, tool 7 and/or drive shaft 2. As shown in FIG. 14, such spring-loading is accomplished by the provision of a continuous peripheral groove 21,22 along the first and second sections 12,13 of the screw holder 3 into which are inserted springs 23,24. In the example shown, each spring is constructed as a spring wire, which essentially runs continuously around the periphery, but is interrupted in one area. Other springs may be used, such as, for example, a correspondingly thin continuous peripheral helical spring.

Figure 5:
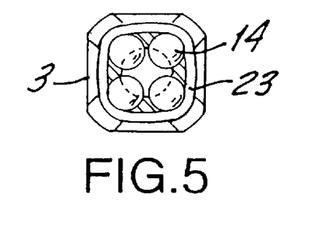
FIG. 5 is a section taken along line V—V in FIG. 3.
Figure 6:
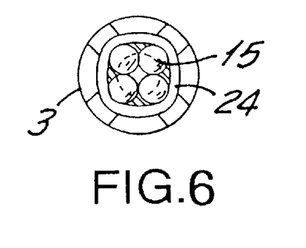
FIG. 6 is a section taken along line VI—VI in FIG. 3.

Springs 23, 24 of different strengths can be used to vary the pressure of the balls 14, 15 as required. For example, since the balls 14 of the first section 12 are merely designed to capture or lock the inserted screw 5 in place and prevent such screw 5 from falling through the end 19 of apparatus 1, the spring 23 might only have to exert a certain, lesser amount of force on such balls 14 to carry out such holding operation. However, since the balls 15 of the second section 13 are required to properly and securely hold and center the screw 5 during the driving process, the spring force acting through the spring 24 on the balls 15 should be preferably correspondingly larger in order to have proper centering at the start of and during the driving or screwing-in process of the inserted screw 5. In order to achieve these results, as shown in FIGS. 5–6, it is preferable if the diameters of the balls 14, 15 of the first and second sections 12, 13 are sized differently. Since the screw holder 3 is provided with a relatively small diameter, particularly along the tubular passage 4, a passage with a smaller cross section can be achieved with balls 15 of a correspondingly smaller diameter. Therefore, screws having a relatively smaller shaft or shank diameter can be centered and held properly in the second section 13.

Figure 4:
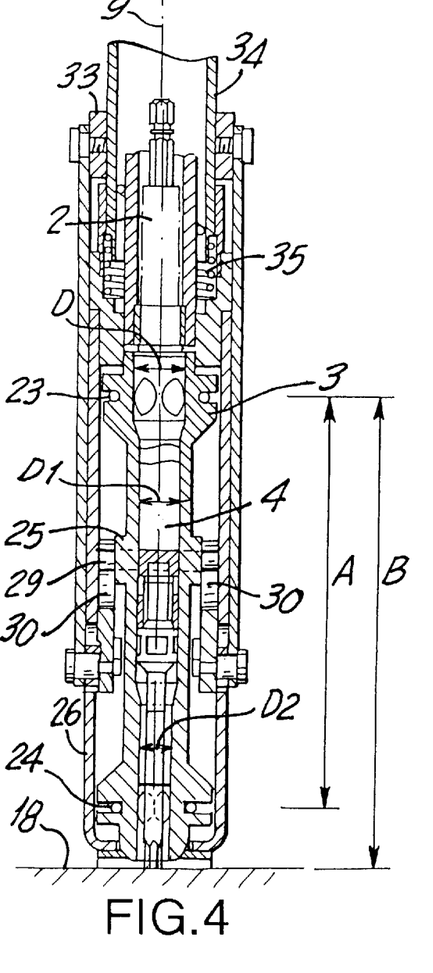
FIG. 4 shows the same section as FIG. 3, but with the drive shaft pressed further downwards.

It is preferable, as shown in FIGS. 3–4, for the tubular passage 4 and the screw holder 3 to be particularly adapted to accommodate the external diameter of the inserted screw head 16, as well as the tool 7 (FIG. 2), engagement tool 6 (FIG. 2) and, where necessary, the drive shaft 2. For example, the internal diameter D of the screw holder 3 along the first section 12 is preferably adapted to match the diameter of the feed tube 11, and should therefore be somewhat larger. If an inserted screw has a correspondingly large or larger head diameter, the tubular passage 4 should exhibit the larger diameter D throughout, i.e. from the first section 12 to the second section 13. In the middle region of the tubular passage 4, a diameter $D_1$ might be provided, which roughly matches the diameter of the drive shaft 2. In the case of inserted screws with smaller head diameters, the tubular passage 4 might be provided with a constricted diameter $D_2$ along the second section 13 so that the screw head 16 and shaft portion 17 is securely held during the driving process.

As shown in FIGS. 1 and 2, the screw holder 3 is mounted on the lower housing part 26 and is pivotable about the horizontal axis 10. Axis 10 is preferably in the region of the second section 13 or between such section 13 and the open end 19 of the apparatus 1. Swiveling or pivoting about the end of the screw holder 3 only requires a relatively small angular movement in order to move from the position aligned with the feed tube 11 to the position aligned with the screw axis 9 (see in particular FIG. 2). The screw holder 3 preferably has a spherical head-shaped bearing surface 27 (see also FIGS. 7–8 and 13–14) in the region of axis 10, which engages a spherical socket-shaped recess 28 on the housing section 26 of the apparatus 1 of the invention. There is, consequently, no need for a rigid bearing or bolt mounting, which would have to be manipulated for every exchange of the screw holder. Instead, the bearing surface 27 of the screw holder 3 is simply inserted into socket 28 (FIG. 13) and pivoted about axis 10. If, however, a bolt 29 (see in particular FIGS. 1–2 and 11–13) is provided for mechanical operation of the screw holder 3 via a connection with a lever member (to be described later), such bolt 29 can be removed and the screw holder 3 pivoted or swiveled past the axis 38 of the feed tube 11 as shown in FIG. 2 for removal and replacement thereof.

Figure 13:
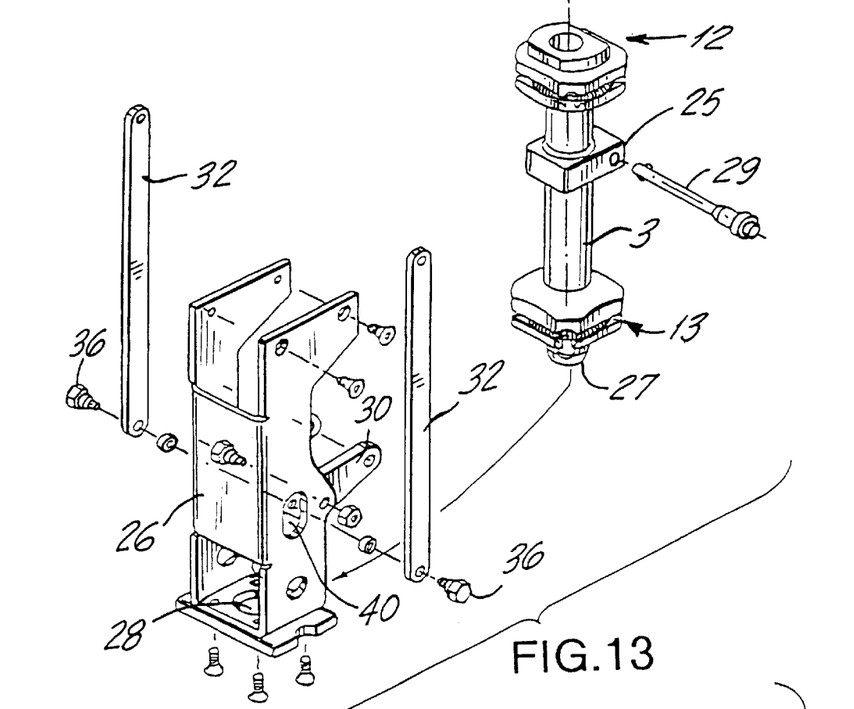
FIG. 13 is a further exploded view of FIG. 12.

The screw holder 3 can be mechanically or automatically swiveled or pivoted about axis 10 via a two-armed lever 30, i.e., a lever having a short arm and a long arm, as a function of the beginning of the downward movement of the drive shaft 2 and the return movement of the drive shaft 2. The two-armed lever 30 is attached to the screw holder 3 via removable bolt 29 engaged through shoulder 25 in the screw holder 3 and is rotatably mounted on the housing 26 about axis 31 (see FIGS. 1 and 11–12). It should be noted that the two-armed levers 30 are provided on opposite sides of the screw holder 3, so that the danger of tilting during these displacement movements is ruled out. Rods 32 are attached to flange 33, which is in turn attached to tube section 34 surrounding the drive shaft 2, and such rods 32 engage the levers 30 via the shorter arm of the two-armed lever 30 and are movable via elongated holes 40 (FIG. 13). By means of appropriate coupling parts in the region of the drive unit (not represented in the drawings), it is possible to cause the tube section 34 to be pressed downward at the start of the driving motion of the drive shaft 2. Flange 33 is thereby pressed downward against the force of spring 35 (FIGS. 2–4), so that the rods 32 operate the two-armed levers 30 via bolts 36 within elongated holes 40 and cause the screw holder 3 to swivel or pivot from a position aligned with the feed tube 11 into a position aligned with the screwing-in axis 9. At the end of the driving-in process, when the drive unit and the drive shaft 2 are returned, the tube section 34 is not released again by the coupling elements until the very last stage of the return movement, whereupon the flange 33 is slid further upwards together with the tube section 34, and the screw holder 3 is then pivoted or swiveled back into alignment with the feed tube 11 via the rods 32, bolts 36 within elongated holes 40, the two-armed levers 30 and the bolt 29 penetrating through the shoulder 25 in the screw holder 3. The upper terminus 37 (FIGS. 2, 7–8) of the screw holder 3 is cylindrically cambered for accurate alignment of the screw holder 3 with the screw axis 9 or central axis 38 of the feed tube 11 without a transitional gap between adjoining parts. This design also permits appropriate matching, so that the bearing 27 provided at the lowermost end of the screw holder 3 is accordingly always firmly engaged with socket 28 of housing 26 (FIG. 13). Nevertheless, after bolt 29 is removed from shoulder 25, the screw holder 3 can be easily removed from the housing 26 and optionally be replaced by a screw holder 3 adapted to receive and deliver screws having different screw diameters.

The operation of the screw holder 3 is fairly straightforward, with the essential advantage of the present invention residing in the first and second sections having spring-loaded centering and locking elements. After a screw 5 is fed through the feed tube 11, the screw head 16 is held captively in the first section 12 by the centering and locking elements 14. Once the screw holder 3 has been swiveled or pivoted into alignment with the screwing-in axis 9 upon an initial depression of the drive shaft 2, the engagement tool 6 is driven into engagement with the screw head 16 and, after a further depression of the drive shaft 2, the screw head 16 forces the spring-loaded balls 14 apart. Almost immediately thereafter, the screw shaft 17 is gripped or held by the balls 15 in the second section 13 for appropriate centering. In addition to the locking and centering elements, the screw 5 is centered by, on the one hand, adapting the internal diameters D, $D_1$ or $D_2$ of the tubular passage 4 (FIG. 4) to the diameter of the screw head 16 and, on the other hand by the engagement of the screw head 16 with the engagement tool 6. For correspondingly longer screws, it would be conceivable for the head of such screws to engage in the second section 13 as well, even when it is resting in the first section 12. The pivoting operation of the screw holder 3 of the invention makes it fundamentally possible to handle even considerably longer screws, or different types of screws with varying screw head and shaft dimensions. Even screws with radially protruding drilling blades or "wings" can be used without a problem, since such blades or wings can protrude through the gaps in the centering and locking elements. The spherically shaped construction of the locking or centering elements ensures that a screw is always turned through a corresponding angle, until the drilling blades or wings can penetrate into the region between two balls.

While the present invention has been described at some length and with some particularity with respect to the described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. For example, the locking and centering elements are described above as spring-loaded balls 14, 15. However, other variations which bring about a holding of the balls in the use position and nevertheless permit them to be forced back are also possible. For example, the weight of the balls could be utilized if they are inserted in radial guides running at an acute angle to the screwing-in axis, in which case spring-loading would not be necessary. Also, a mechanical locking of the balls dependent on the advance of the drive unit or the screwing tool would also be conceivable.

We claim:

1. An apparatus for driving a screw into a workpiece, said apparatus having a housing with an end positionable on the workpiece, said apparatus comprising:
    a drive unit attached to the housing and having a drive shaft connected to an engagement tool,
    a feed tube mounted to said housing,
    a screw holder pivotably mounted on the housing and having a tubular passage, said screw holder being pivotable between a first position, in which the tubular passage is aligned with said feed tube to allow the screw to be loaded into the screw holder via the feed tube, and a second position, in which the tubular passage is aligned with said drive shaft to allow the engagement tool to engage the screw when the screw is in the screw holder, said screw holder having a first section proximate one end of the tubular passage through which said screw is initially received and a second section proximate another end of the tubular passage through which said screw is eventually driven,
    a first plurality of locking and centering elements disposed in said first section to temporarily capture the screw when the screw is in the tubular passage,
    a second plurality of locking and centering elements disposed in said second section and adapted to center and guide the screw during at least a portion of the driving of the screw into the workpiece, and
    wherein said first and second plurality of locking and centering elements are adapted to be displaced radially outwardly in response to the passage of the screw through said tubular passage.

2. The apparatus of claim 1, wherein said first and second plurality of locking and centering elements are biased radially inwardly.

3. The apparatus of claim 2, wherein said first and second sections comprise a plurality of radial guides along which said first and second plurality of locking and centering elements are displaced.

4. The apparatus of claim 1, wherein said first and second plurality of locking and centering elements are radially inwardly biased by a plurality of springs.

5. The apparatus of claim 4, wherein each of said plurality of springs reside in one of a plurality of grooves provided along said first and second sections of said screw holder.

6. The apparatus of claim 4, wherein a first biasing force applied to the first plurality of locking and centering elements is different from a second biasing force applied to the second plurality of locking and centering elements.

7. The apparatus of claim 1, wherein said first and second plurality of locking and centering elements are balls.

8. The apparatus of claim 7, wherein said balls associated with said first section of said screw holder have a different diameter than said balls associated with said second section of said screw holder.

9. The apparatus of claim 1, wherein a diameter of said tubular passage is uniform throughout.

10. The apparatus of claim 1, wherein a diameter of said tubular passage along said first section of said screw holder is greater than the diameter of said tubular passage along said second section of said screw holder.

11. The apparatus of claim 1, wherein said screw holder is provided with and pivotable about a spherical bearing member disposed proximate to said second section of said screw holder.

12. The apparatus of claim 1, wherein said screw holder pivots into alignment with said drive shaft when said engagement tool is driven toward the end of the housing.

13. The apparatus of claim 12, further comprising a drive housing attached to the housing and enclosing at least a portion of the drive unit, said screw holder being coupled to said drive housing via a lever.

14. The apparatus of claim 1, further comprising a screw disposed in the screw holder and having a length, wherein an axial distance between said first section of said screw holder and said end of said housing is equal to the length of said screw.

15. The apparatus of claim 1, further comprising a screw disposed in the screw holder and having a length, wherein an axial distance between said first section of said screw holder and said end of said housing is greater than the length of said screw.

16. An apparatus for driving a screw into a workpiece, the apparatus having a housing, the apparatus comprising:
    a drive unit attached to the housing and having a drive shaft displaceable along a drive axis, the drive shaft being connected to an engagement tool,
    a feed tube coupled to said drive unit and disposed along an axis that is angled with respect to said drive axis, a screw holder pivotably mounted on the housing and having a tubular passage, said screw holder being pivotable between a first position, in which the screw holder is aligned with said feed tube, and a second position, in which the screw holder is aligned with the engagement tool, said screw holder having a first section proximate one end of the tubular passage, through which the screw is initially received, and having a second section proximate another end of the tubular passage through which the screw is eventually driven, and a plurality of locking and centering elements are disposed in each of said first and second sections for movable engagement with said screw in response to the passage of the screw through said tubular passage.

17. The apparatus of claim 16, wherein said plurality of locking and centering elements temporarily capture at least a head portion of the screw at least during a portion of the time that the screw is located in the tubular passage.

18. The apparatus of claim 17, wherein said plurality of locking and centering elements are adapted to be displaced radially outwardly upon insertion of said screw into said screw holder.

19. The apparatus of claim 16, wherein said plurality of locking and centering elements are adapted to be radially inwardly biased to center and guide the screw during a portion of the driving of the screw into said workpiece.

20. The apparatus of claim 16, wherein said plurality of locking and centering elements are biased by an elastic member located around a perimeter of the screw holder.

21. The apparatus of claim 16, wherein said plurality of locking and centering elements are balls.

* * * * *